J. A. PARKER.
COTTON CHOPPER.
APPLICATION FILED AUG. 26, 1910.
995,895.
Patented June 20, 1911.
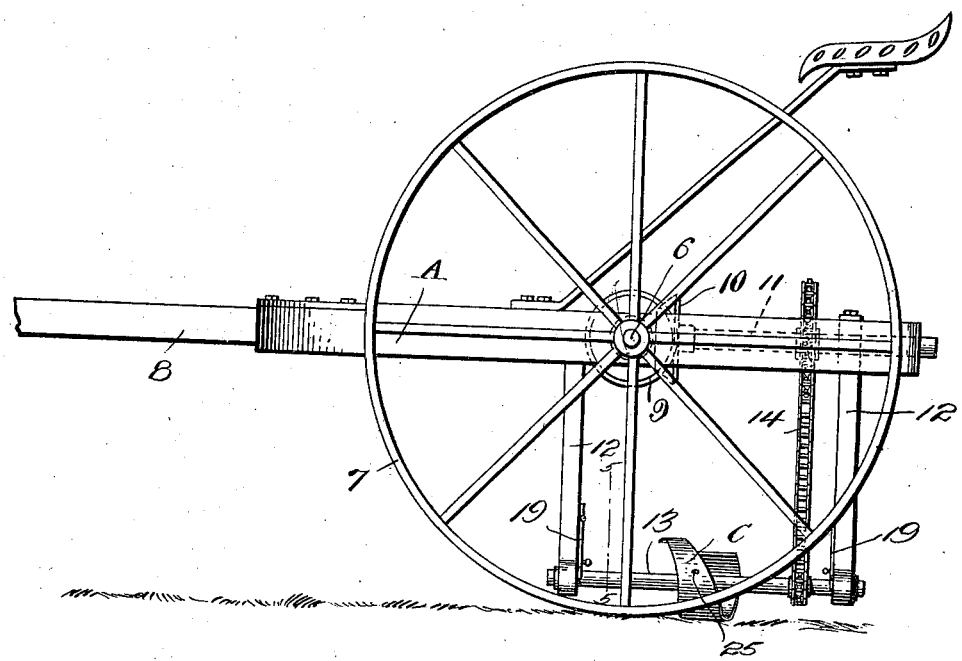
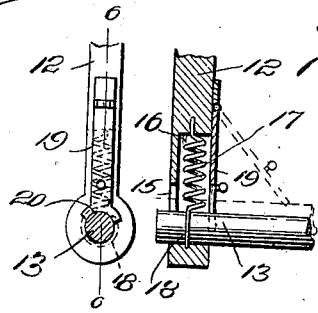
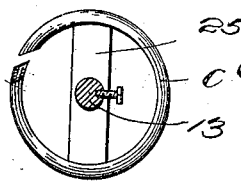
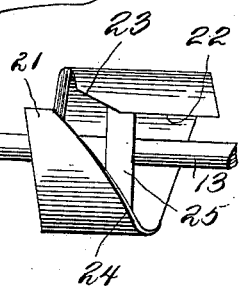
Witnesses
Inventor
John A. Parker
By Victor J. Evans
Attorney

UNITED STATES PATENT OFFICE.

JOHN A. PARKER, OF TERRY, MISSISSIPPI.

COTTON-CHOPPER.

995,895.  Specification of Letters Patent. Patented June 20, 1911.

Application filed August 26, 1910. Serial No. 578,997.

*To all whom it may concern:*

Be it known that I, JOHN A. PARKER, a citizen of the United States of America, residing at Terry, in the county of Hinds and State of Mississippi, have invented new and useful Improvements in Cotton-Choppers, of which the following is a specification.

This invention relates to cotton choppers, and it has for its object to construct a cotton chopping machine having a cutting blade supported for rotation, said blade being equipped with a spirally disposed cutting edge that exercises a shearing action, whereby the superfluous plants that are to be removed as well as grass and weeds growing adjacent to the row of plants that is to be operated upon will be eliminated without danger of uprooting the plants that are to be left standing.

A further object of the invention is to provide a revolving cutter of simple and improved construction.

A still further object of the invention is to provide simple and improved supporting means for the cutter-carrying shaft.

Still further objects of the invention are to simplify and improve the general construction and operation of a machine of the character outlined above.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention; it being, however, understood that no limitation is necessarily made to the precise structural details therein exhibited, but that changes, alterations and modifications within the scope of the invention may be resorted to when desired.

In the drawings,—Figure 1 is a side elevation of a cotton chopper constructed in accordance with the invention. Fig. 2 is a transverse sectional view of the cutter-carrying shaft, the cutter being shown in end elevation. Fig. 3 is a side view in elevation of the cutter and a portion of the shaft carrying the same. Fig. 4 is a sectional detail view taken on the plane indicated by the line 5—5 in Fig. 1. Fig. 5 is a sectional detail view taken on the plane indicated by the line 6—6 in Fig. 4.

Corresponding parts in the several figures are denoted by like characters of reference.

The frame A of the improved machine is supported upon a revolving axle 6 having transporting wheels 7; a tongue 8 is provided for the attachment of the draft.

The revolving axle 6 carries a beveled gear 9 meshing with a similar beveled gear 10 upon a longitudinal shaft 11 which is supported for rotation upon the frame approximately at right angles to the axle. The frame is provided with downwardly extending brackets 12 provided adjacent their lower ends with bearings for the cutter-carrying shaft 13 which receives motion by means of a chain transmission 14 upon the longitudinal shaft 11. The brackets 12 are provided near their lower ends with slots 15 wherein the shaft 13 may be supported, and adjacent to said slots and extending upwardly therefrom are formed sockets 16 wherein springs 17 are fitted and supported at their upper ends. The lower ends of the springs 17 are provided with eyes 18 surrounding the ends of the shaft 13 and tending to move the same in an upward direction.

Lids or covers 19 which are hingedly supported adjacent to the upper ends of the recesses 16 are provided at their lower extremities with arcuate recesses 20 adapted to engage the upper side of the shaft 13 and to force the latter downward against the tension of the springs 17. It follows that when the lids 19 are closed down against the faces of the brackets 12, the cutter-carrying shaft will be forced downward against the tension of the supporting springs, whereas, when the lids 19 are raised to the position shown in dotted lines in Fig. 6, the tension of the springs will be exerted to lift the shaft and the cutter carried thereby to a position above the ground where the cutter will not interfere with the progress of the machine, thus enabling the latter to be transported from place to place.

The cutter C consists of a single blade which may be described as being formed of an elongated approximately triangular blank by coiling the same spirally upon a cylindrical mandrel in such a manner that the pointed end or apex 21 of the triangular blank shall be presented in advance of the base 22, as will be clearly seen by reference to Fig. 4 of the drawings, said base having its forward corner cut off or trimmed diagonally, as shown at 23, so that a distinct gap or opening of a width gradually increasing in a rearward direction will be formed between the spirally coiled rear edge 24 of the blade and the base 22. The direction of rotation is indicated by an arrow upon the blade shown in Fig. 4. The blade is securely mounted upon the shaft by means of arms 25 radiating from the latter.

From the foregoing description taken in connection with the drawings hereto annexed, the operation and advantages of the invention will be readily understood by those skilled in the art to which it appertains. When the cutter-carrying shaft is lowered to an operative position, the transmission chain 14 will be stretched taut, and when the machine progresses in a forward direction, a rotary movement in the desired direction will be imparted to the cutter-carrying shaft, the cutter being supported in a suitable ground-engaging position. As the machine advances, the sharp front edge of the cutter will engage the ground with a shearing cut, and the row of plants engaged by the cutter will be removed, together with the weeds and grass growing adjacent thereto until the gap or opening in the cutter is reached, when a suitable stand will be left, the accumulated material being discharged through the gap of the cutter adjacent to one side of the road. It is obvious that a device operating in this manner cannot injure the plants that are left standing, and the operation is simple and thoroughly efficient.

Having thus described the invention, what is claimed as new, is:—

A shaft and a cutter supported upon and spaced from said shaft, said cutter consisting of an approximately triangular blade coiled about and approximately concentric with the shaft and having a spirally disposed cutting edge, the point of the blade being advanced forwardly of the base, and said base being provided with a cut-off corner, whereby a gap widening rearwardly is formed between the apex and the base.

In testimony whereof I affix my signature in presence of two witnesses.

JOHN A. PARKER.

Witnesses:
S. W. FURIEN,
W. L. PIERCE.